(12) United States Patent
Hinkle

(10) Patent No.: US 8,850,408 B2
(45) Date of Patent: Sep. 30, 2014

(54) METHODS AND/OR SYSTEMS FOR DETERMINING A SERIES OF RETURN CALLSTACKS

(75) Inventor: Chad Hinkle, Redmond, WA (US)

(73) Assignee: Nintendo of America, Inc., Redmond, WA (US)

( * ) Notice: Subject to any disclaimer, the term of this patent is extended or adjusted under 35 U.S.C. 154(b) by 307 days.

(21) Appl. No.: 13/206,597

(22) Filed: Aug. 10, 2011

(65) Prior Publication Data
US 2013/0042223 A1 Feb. 14, 2013

(51) Int. Cl.
*G06F 9/44* (2006.01)
*G06F 11/36* (2006.01)

(52) U.S. Cl.
CPC ........ *G06F 11/3636* (2013.01); *G06F 11/3612* (2013.01)
USPC ............................ 717/133; 717/127; 717/128

(58) Field of Classification Search
None
See application file for complete search history.

(56) References Cited

U.S. PATENT DOCUMENTS

| | | | | |
|---|---|---|---|---|
| 6,651,243 | B1 * | 11/2003 | Berry et al. | 717/130 |
| 7,509,632 | B2 * | 3/2009 | Boger | 717/133 |
| 7,730,460 | B1 * | 6/2010 | Warren et al. | 717/133 |
| 7,904,888 | B2 * | 3/2011 | Berry et al. | 717/128 |
| 8,732,671 | B2 * | 5/2014 | Pedersen | 717/128 |
| 2005/0149904 | A1 * | 7/2005 | Ball et al. | 717/100 |
| 2005/0193375 | A1 * | 9/2005 | Larson | 717/127 |
| 2006/0101413 | A1 * | 5/2006 | Kinno et al. | 717/127 |
| 2006/0218543 | A1 * | 9/2006 | Boger | 717/157 |
| 2010/0083234 | A1 * | 4/2010 | Rabin | 717/127 |
| 2011/0145800 | A1 * | 6/2011 | Rao et al. | 717/133 |
| 2011/0154300 | A1 * | 6/2011 | Rao et al. | 717/133 |
| 2011/0271148 | A1 * | 11/2011 | Eigler et al. | 714/45 |
| 2012/0297371 | A1 * | 11/2012 | Greifeneder et al. | 717/128 |

OTHER PUBLICATIONS

Makris, Kristis, and Rida A. Bazzi. "Immediate Multi-Threaded Dynamic Software Updates Using Stack Reconstruction." USENIX Annual Technical Conference. vol. 2009. 2009., Retrieved on [Jul. 9, 2014] Retrieved from the Internet:URL<http://static.usenix.org/legacy/events/usenix09/tech/full_papers/makris/makris.pdf>.*

Feng, Henry Hanping, et al. "Anomaly detection using call stack information." Security and Privacy, 2003. Proceedings. 2003 Symposium on. IEEE, 2003, pp. 62-75, Retrieved on [Jul. 9, 2014] Retrieved from the Internet: URL<http://ieeexplore.ieee.org/xpls/abs_all.jsp?arnumber=1199328>.*

* cited by examiner

*Primary Examiner* — Thuy Dao
*Assistant Examiner* — Cheneca Smith
(74) *Attorney, Agent, or Firm* — Nixon & Vanderhye, P.C.

(57) ABSTRACT

To reconstruct a call stack, a range of call addresses is determined. Based on the range of addresses, raw stack data is extracted based on the execution of a computer program. The raw stack data is parsed to reconstruct a call stack (or a series of call stacks). In obtaining the call stack, a depth between a function and a return address is calculated.

19 Claims, 9 Drawing Sheets

Example Function Execution

Example Stack Use

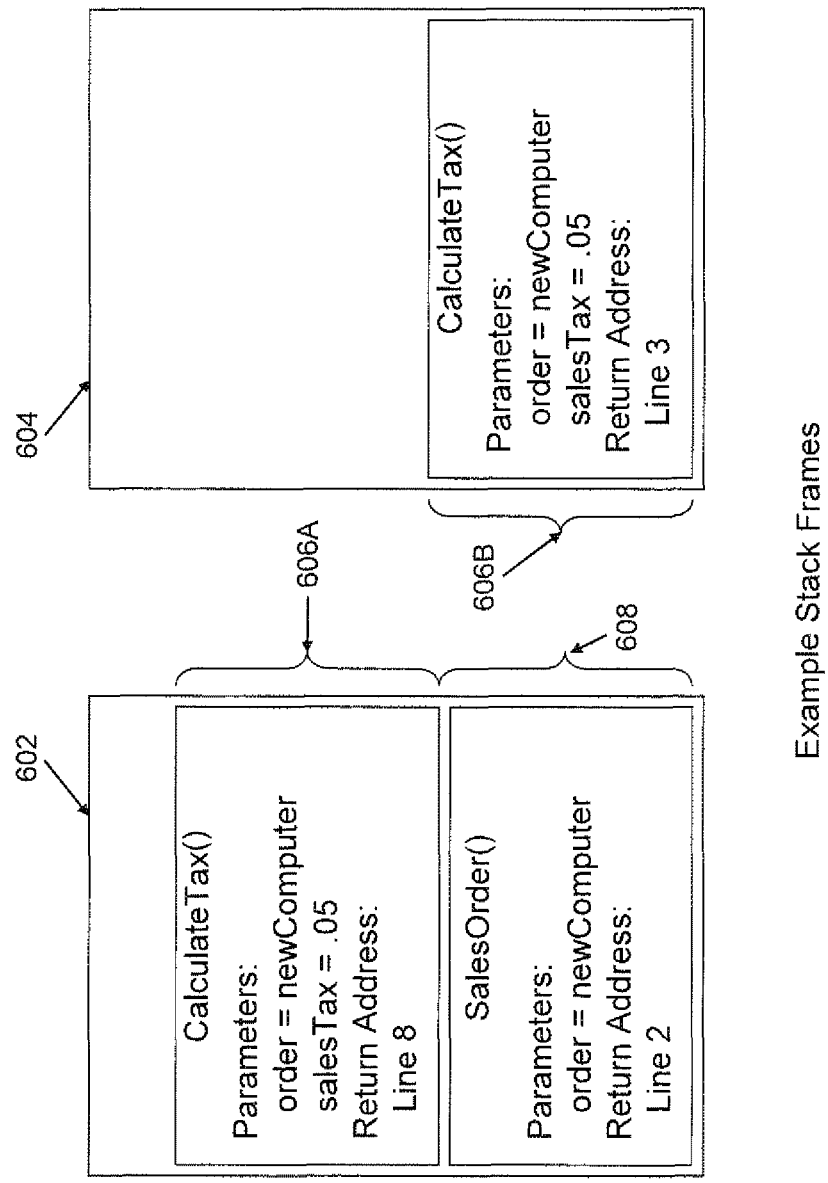

METHODS AND/OR SYSTEMS FOR DETERMINING A SERIES OF RETURN CALLSTACKS

CROSS-REFERENCES TO RELATED APPLICATIONS

STATEMENT REGARDING FEDERALLY SPONSORED RESEARCH OR DEVELOPMENT

FIELD

The technology herein relates to analyzing computer program execution and flow. In particular, the technology herein relates to determining a call stack of an executing computer program.

BACKGROUND AND SUMMARY

Computer programs vary in scope and usage. They range from web browsers and word processors to video games and business applications. While the functionality of computer programs may vary greatly, all programs commonly include a series of instructions that direct a computer(s) to perform a task(s).

One common technique for structuring a program is to break the program into multiple subroutines or functions. Functions typically operate to accomplish a specific task. For example, a sales function may execute instructions to place a new sales order. As part of this process, the sales function may call a tax function that calculates the sales tax for the new sales order. FIG. 1A illustrates an example of multiple function calls. Main 22 calls SalesOrder 24 which then calls SalesOrder 26 again. Subsequently, Tax 28 is called, which then returns to SalesOrder 26.

The computer stores its instructions in memory. The instructions to carry out functions are typically located in different memory locations of a computer. During program execution, the computer needs to know how to transfer the execution (e.g., the currently executing instruction) from one function to another and sometimes back again. To use the above sales and tax example, this may be thought of as moving a task from the sales department to the accounting (or tax) department in a company and back again.

To transfer execution from the sales function to the tax function above (e.g., SalesOrder 26 to Tax 28), the relative or absolute location of the tax function can inserted into the sales function. This works fine to get from the sales function to the tax function. However, a way must also be provided to get back. Because multiple functions may call the tax function, the tax function may not always return to the same calling function. Therefore, when tax 28 returns from executing and the processor needs to transfer execution back to sales 26, it may not be possible to rely on an insertion of location. For example, it would be like assuming that just because one flight from Seattle landed at Washington-Dulles airport that all passengers from all flights who landed at Washington-Dulles wish to return to Seattle. Rather, the computer must keep track of which function called the currently executing function so that control can be returned to the correct place when the currently executing function finishes. This issue may be further complicated by "nesting", e.g., a first function calling a second function, which calls a third function, etc.

Certain computer architectures use a stack to store executing functions in memory. To address the above discussed execution issues, a stack includes call stack information that helps determine the sequence of how the functions are called.

Thus, a call stack can be thought of as a breadcrumb trail that allows an executing program to "find" its way back after a function (e.g., the tax function above) finishes executing. FIG. 1B illustrates the use of a stack for the above function calls in FIG. 1A. Here, each time a function is called, the function is "pushed" to the stack as a stack frame. These stack frames serve, in part, to store the "breadcrumb," or call stack, for executing the program. Correspondingly, when a function is finished executing, it is "popped" from the stack and program control returns to the caller function by referencing the stored "breadcrumb." For example, the second time the SalesOrder function is called, a second stack frame associated with SalesOrder is added to the stack on top of the currently existing stack frame. A part of this new stack frame is the address, or breadcrumb that allows the program to return to the first SalesOrder when the second SalesOrder is complete. Thus, a call stack may organize program execution so that execution may be passed back and forth between functions in an orderly way.

Information in call stacks can also help analyze the flow of a computer program. Understanding the current execution context of a function (e.g., did the function Main call SalesOrder or did SalesOrder call SalesOrder?) can help resolve bugs, performance problems, or other issues. In contrast, simply looking at the current function that is executing may not provide enough information for a developer to properly asses the status of the computer program. For example, is the problem with the current function or the function that called the current function?

The example code section in Table 1 and the corresponding call stacks in FIG. 7 may illustrate this concept:

TABLE 1

| Line # | Instruction |
| --- | --- |
| 1 | Main( ) { |
| 2 | SalesOrder(newComputer); |
| 3 | CalculateTax("100"); |
| 4 | Return;} |
| 5 | Function SalesOrder (var order) { |
| 6 | If order == newComputer { |
| 7 | SalesOrder(mouse); } |
| 8 | CalculateTax(order); |
| 9 | Return;} |
| 10 | Function CalculateTax (var order) { |
| 11 | var salesTax = .05; |
| 12 | Print(order.price * salesTax); |
| 13 | Return;} |

In this example, the function "CalculateTax(var order)" is called twice (Line 3 and Line 8). In this instance, the two function calls have two different breadcrumb trails (e.g., call stacks). Further, in both cases, the nature of the breadcrumb trail can help provide information on the nature of the program flow.

For example, call stack 602 includes two stack frames, each of which includes a return address (e.g., breadcrumb). Stack frame 606A relates to the execution of the CalculateTax function and has a return address of 8. Similarly, stack frame 608 is associated with the execution of the SalesOrder function and will return to line 2. Conversely, while the same CalculateTax function may be executing in relation to stack 604 and associated with stack frame 606B, the context of the execution may be different from that in stack 602.

In addition to storing the return address, a stack frame may also store other types of information. For example, a stack frame may include locale variables or parameters that may only exist for that instance of the function.

For those writing and developing computer programs, such information regarding how a given program executes (or flows) can be valuable in developing better, more efficient software and resolving problems. Thus, it would be beneficial to provide call stack information so that a program's flow may be determined.

The way to get call stack information may vary depending on the type of computer architecture a program is executing on. In certain types of computer architectures, a portion of a stack may be stored on the processor rather than in memory. For example, an ARM processor may store the return address of the currently executing function in the link register (e.g., the R14 register). However, it may not be straightforward to determine what the whole call stack looks like (e.g., as shown in FIG. 1B). To compound the problem of determining the call stack, it may be desirable to decrease the amount of time and/or memory used to determine what the call stack looks like.

One area of computing that this may be the case is in the area of handheld devices where the small size, cost considerations, and power constraints for the operating processors all may factor into the architecture. Furthermore, in mobile computing, using debug versions of software code may be prohibitive because of the processing limitations of the handheld device. Also, the addition of debug information to certain programs may have a dramatic effect on performance. For example, some applications for handheld devices may be particularly processing intensive (e.g., more so than a word processing application). Thus, adding debug code may not be a realistic solution for an engineer attempting to diagnose a performance problem (or some other issue) for a given application that operates on a handheld device.

Accordingly, it would be desirable to develop systems and/or methods that determine or assist in discovering call stacks that relate to an executing computer program.

In certain example embodiments, as part of obtaining raw stack information, the current program counter of an executing program is stored. This may indicate what instruction the program is currently executing. At this point the current depth of the stack is also stored to the raw stack information. In certain example embodiments, this information may be associated with the currently executing instruction that is/was stored. The depth may be determined by subtracting the starting address of the stack from the address pointed to by the stack pointer. After these values, the current return address for the currently executing function may be stored. In certain example embodiments, if the address is a valid address (e.g., within the address range determined previously) the information may be located in the link register. This address may be stored with an associated depth value, for example, −1 to indicate that the address was stored in the link register.

After storing the above values, the process walks down the address space of the call stack (e.g., between the stack pointer and the starting address of the stack) storing addresses that are classified as "valid" (based on the above determined range) with an associated depth (e.g., subtract the current depth of the current address from the starting point address of the call stack). The process continues until the current depth is equal to the starting depth.

In certain example embodiments, addresses in the raw stack data may be mapped to associated function names. In certain example embodiments, this may be done by examining the symbol file and comparing the addresses in the raw stack with the addresses in the symbol or compile file. In addition, for the functions in the raw stack data, the executable assembly code for those functions may be obtained. In certain example embodiments, these techniques may be performed on a host computing system.

In certain example embodiments, a process may loop through the returned raw stack information and piece together related (e.g., parent-child or caller/callee relationships) to form a call stack.

Thus, for example:
1) If the end of the stack has been reached, stop looping;
2) Determine the depth of the stack of the current address in the stack;
3) If the depth is zero, and the process is not at the bottom of the stack, the Link Register may have the parent function. This may be the next item on the raw stack.
4) Otherwise, if there has not been an error in finding the parent, use the current stack depth to find the next function in the stack.
   a. If the link register was not stored on the stack, the link register may have the parent function (e.g., as the next item on the stack).
   b. Add the current depth to the known stack depth (e.g., the information of the raw stack information) to determine where the next function is stored on the stack. If the process locates an address at the calculated depth, then that address may be the parent function.
5) If the process has not yet found a function it may determine all possible stack depths for a function, and try each of them, from the largest depth to the smallest depth, to see if a function can be found.
   a. In this instance, values that may traverse the stack in the wrong direction may be ignored.
6) If the process only locates the program counter and the link register and an error is not yet set, set an error and reset the current depth to the initial stack depth and begin again at 1).
7) If the process still has not found anything, a place holder may be set (e.g., "unknown") to let the user know of the problem.

In certain example embodiments, no debugging information may be used. For example, certain example embodiments may operate such that no DWARF debug information is included in the computer program.

In certain example embodiments, it may be desirable to relatively decrease the processing and memory impact on a computer running a computer program while obtaining call stack information. In certain example embodiments, an executing computer program may be relatively unaffected by a process or program that is run to at least help discover or build a call stack.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 7 shows example call stacks.

DETAILED DESCRIPTION

Certain example embodiments herein relate to obtaining raw stack information of an executing (or executed) computer program from a computer system. Certain example embodiments split the task of "discovering" raw stack information between the target computer system and another system that is used for further analysis of raw stack data. In certain example embodiments, the target system may be a handheld and the other system may be a desktop system (e.g., a development system).

Figure 1A:
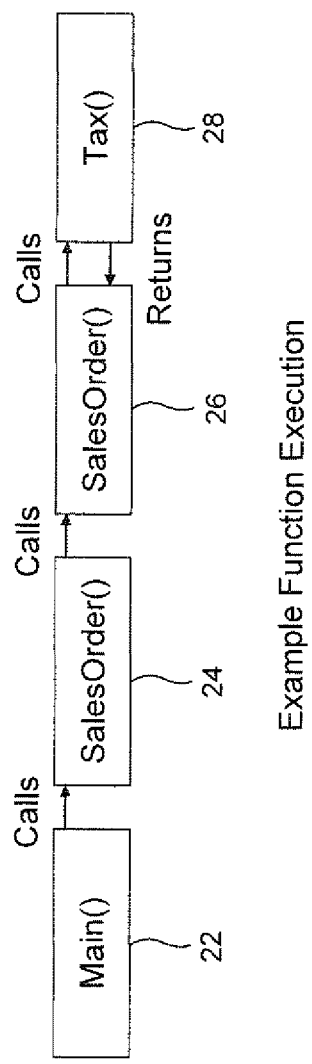
FIG. 1A shows an example series of function calls.
Figure 1B:
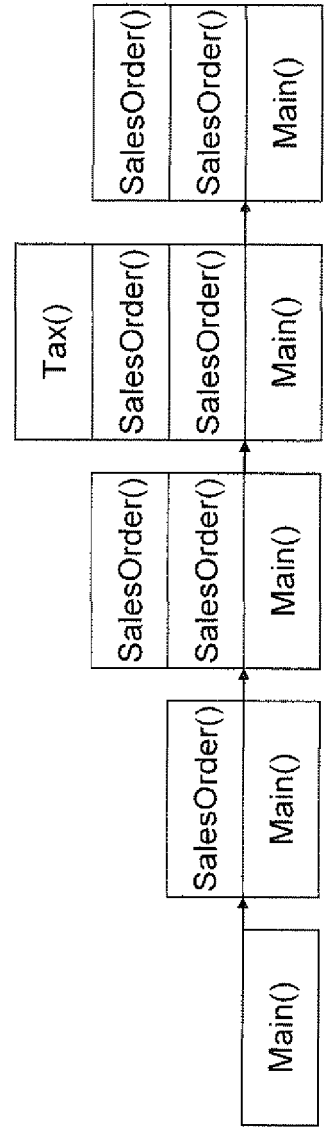
FIG. 1B shows an illustrative stack use related to the function calls of FIG. 1A.
Figure 2A:
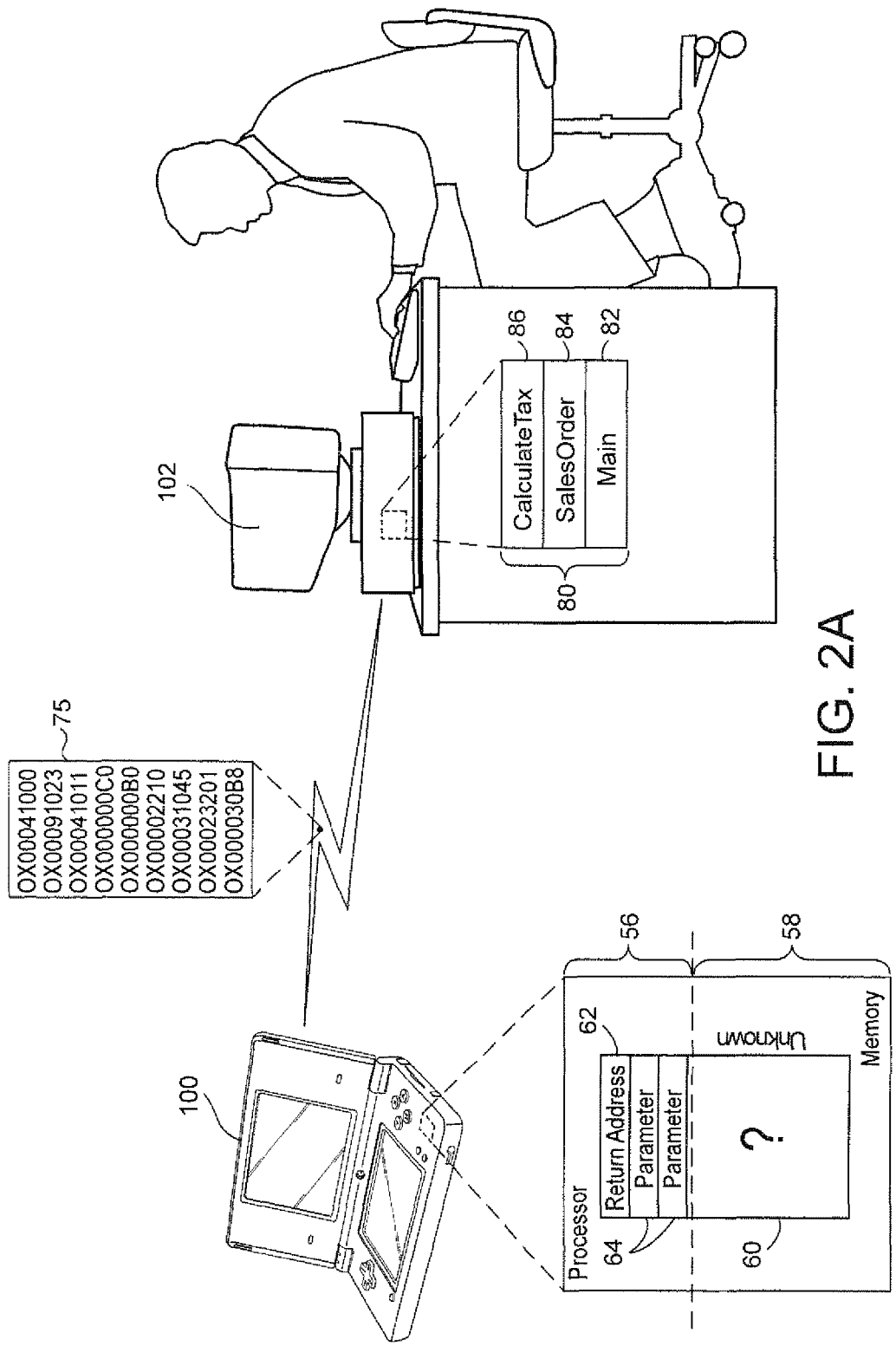
FIG. 2A is exemplary illustration of an exemplary system according to certain example embodiments.
Figure 2B:
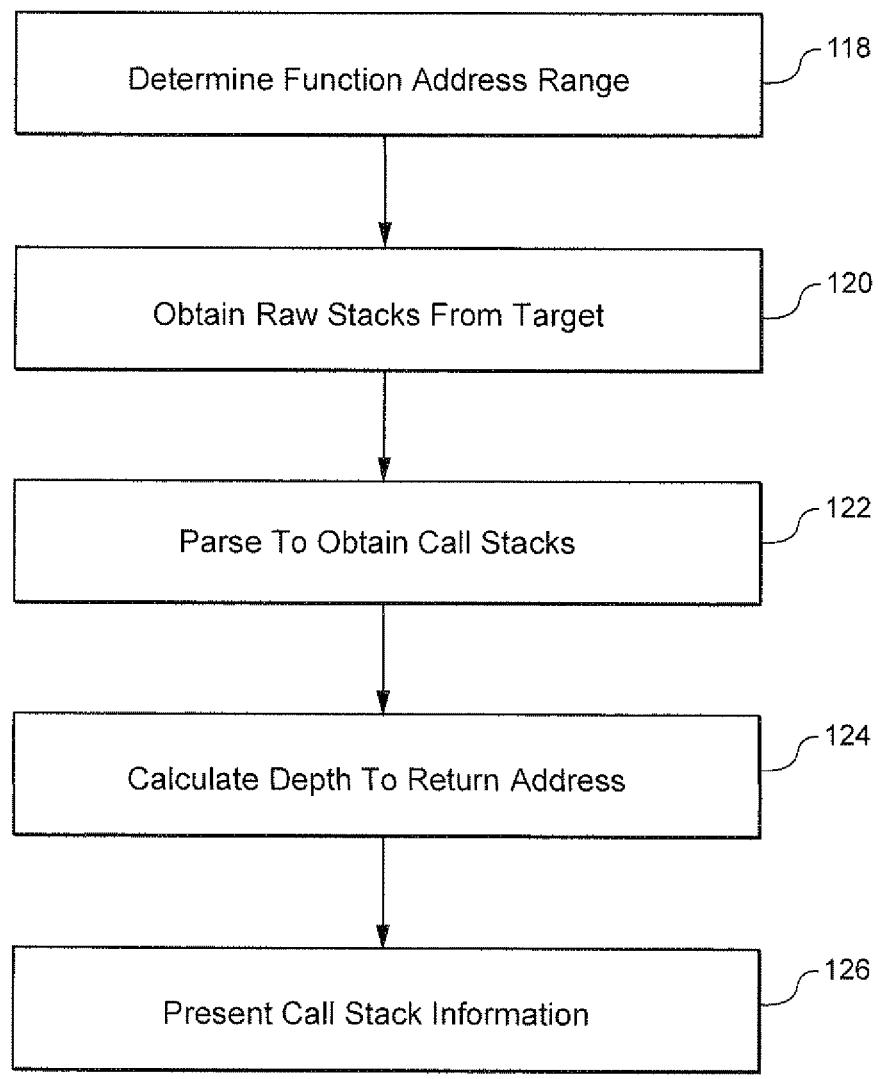
FIG. 2B shows a flow chart of an exemplary process for determining a call stack according to certain example embodiments.

FIG. 2A shows an exemplary system according to certain example embodiments and FIG. 2B shows a flow chart of an exemplary process for determining a call stack. An example computer program, such as an image editing program or a video game, may be developed on computer system 102 and designed to be used with target system 100. In certain example embodiments, the target system may be a handheld device. For example the target system may be as described in U.S. application Ser. No. 13/006,039, the entire contents of which are hereby incorporated by reference. Alternatively, the target system 100 may be a full desktop computer. Thus, for example, both computer system 102 and target system 100 may be desktops systems. Alternatively, one or both of target system 100 and/or computer system 102 may be virtual machines. Further, the techniques described herein may be used in conjunction with a single processing system (e.g., where target system 100 and computer system 102 are the same system).

In certain example embodiments, an example computer program may include compiled source code that is examined by the computing system 102, in step 118, to determine how the compiled source code is organized. The result of this examination may be a range of address space (or a range of address offsets) that indicate the location of functions within the compiled computer program and/or how those functions will be stored in memory when the computer program is executed. After determining the address range in step 118, the computer program may be executed on the target system 100.

As part of the execution process, the processor 56 of the target system 100 may maintain a call stack 60 for the computer program during execution. In certain example embodiments, the call stack 60 may be maintained in both the registers 62 and 64 on the processor 56 and in memory 58. In certain example embodiments, call stack information that is stored in the registers is information relating to the currently executing function. However, while call stack information, such as the return address of the currently executing function, may be available in register 62, information on the remainder of the call stack (e.g., located in memory 58) may be "unknown."

Accordingly, in certain example embodiments, the raw stack information (e.g., including known and "unknown" elements) may be obtained in 120 from the target system 100. As described in greater detail below, this may include allocating a buffer on the target system 100 to store address information that falls within the above determined address range. In any event, raw stack data 75 from the target system 100 may be acquired and then sent to the computer system 102. In certain example embodiments, the raw stack data 75 may be a set of addresses and/or stack depths that are stored as a result of the obtaining step 120. For example, each address may be stored with an associated stack depth. In certain example embodiments, the stack depth may be the distance from the start or beginning of the stack to the location of the address within the stack.

Once the raw stack data 75 is received on the computing system 102, it may be parsed in step 122. The parsing process of step 122 may include determining a depth between a given address and a return address in step 124. For example, the depth between the end of the SalesOrder Function (e.g., line 11 in Table 1) and the address of the caller (e.g., line 3 or line 6) may be determined. In certain example, embodiments, this determination may include static and/or dynamic code analysis of the compiled executable computer program (e.g., the assembly code).

As a result, a call stack may be developed for a given execution point (e.g., program counter) and may be presented to a user in step 126. For example, the call stack may be displayed to a user as part of an analysis program that is used to assist in developing computer programs. Thus, for example, the raw stack data including addresses may be deciphered to produce call stack 80 that is displayed to a user, where the call stack 80 shows that Main 82 called SalesOrder 84, which subsequently called CalculateTax 86.

Obtain Function Address Range

As mentioned above, in certain example embodiments, the address range of the functions of a computer program may be determined or obtained by viewing the symbol table or other similar files that are used to compile a program. For example, for a handheld device using an ARM microprocessor the symbol file may be an Executable and Linkable Format (ELF) file. This file may associate address space (or offsets) in the program to function names and/or global variables. For example, the above example program from Table 1 with a "Main" function and two other functions called "SalesOrder" and "CalculateTax" may generate the following symbol table when the computer program is compiled.

TABLE 2

Symbol Table

| Address | Function Name |
|---------|---------------|
| x04     | Main          |
| x12     | SalesOrder    |
| x20     | CalculateTax  |

When the program is compiled, loaded, and executed on target system 100, the function "Main" may be executed at an offset of x04 from the base address the program, the function SalesOrder may be located at an offset of x12, and the function Calculate Tax may be located at an offset of x20. With this information, the addresses on the stack may be compared to the range to see if a given address is a potential function address.

Thus, in certain example embodiments, instead of checking or storing the whole address space of an operating program, an operating system, or even the address space of the stack, a smaller subset may be used for the raw stack data 75.

In certain example embodiments, the target system may operate by contiguously allocating address space for program execution. In alternative implementations (e.g., where there is not a guarantee of contiguous address space) multiple range checks may be used over the multiple address locations in order to determine address areas that hold functions. However, in either instance, a range or ranges of addresses may be checked on the target system 100 to assist in obtaining raw stack data 75.

Obtaining Stack Data

In certain example embodiments, it may be desirable to decrease the impact on processing time and/or address space that is used for obtaining stack information from an executing computer program. For example, target system 100 may have relatively limited processing power and/or memory. Thus, increasing the processing load or memory requirements on the target system, even a small margin, may adversely affect program performance. Further, in certain instances, it may be advantageous to analyze the executing computer program under conditions that are similar to those experienced by an ordinary user. In certain example embodiments, the range check described above may help in this regard. These checks may help decrease the amount of invalid data that is stored as raw stack data and/or processing time used to obtain the raw stack information.

Figure 3:
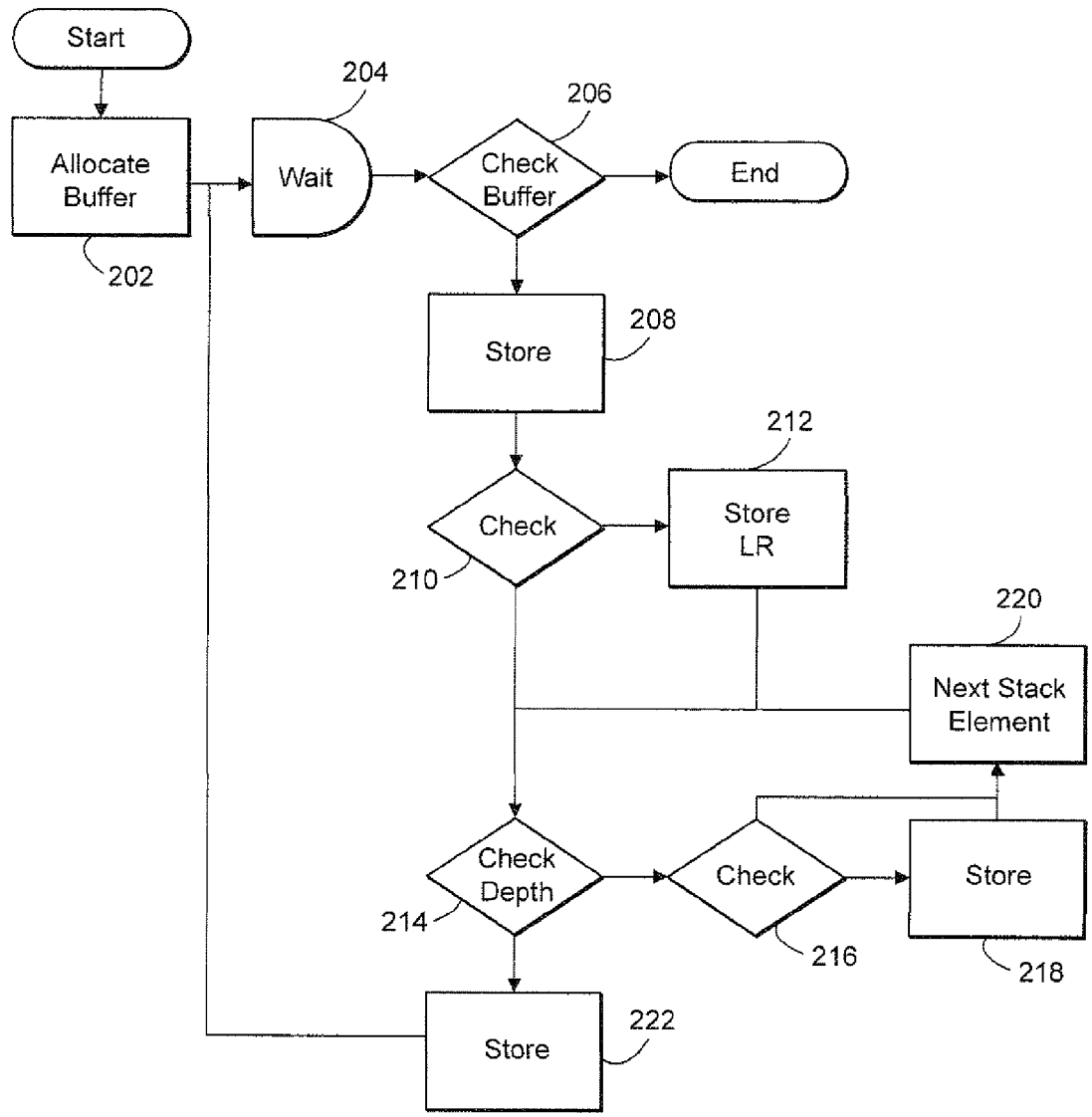
FIG. 3 shows an illustrative flowchart for obtaining stack information from an executing computer program according to certain example embodiments.

FIG. 3 shows an illustrative flowchart for obtaining stack information from an executing computer program according to certain example embodiments. For an example executing computer program, in step 202, a buffer is allocated on the target system 100. In certain example embodiments, the buffer is configured to store multiple raw stacks. Alternatively, or in addition, instead of holding multiple raw stacks in a buffer, each raw stack may be sent to the computing system 102 in "real-time."

After allocating a buffer to store raw stack information on the target system 100, the example process may wait for the application to modify the program counter (e.g., the currently executing instruction) and/or stack depth in step 204. In certain example embodiments, the process may watch a register to see if a value in the register changes to a predetermined value. For example, referring to the example pseudo-code in Table 1, when the function "CalculateTax" is called from within "SalesOrder" both the program counter and the stack depth may change. The program counter may move from line 8 to line 11 and the stack depth may increase as a result of pushing the function "CalculateTax" onto the call stack. In certain example embodiments, the stack depth may increase for each new function that is called and pushed onto the stack. Correspondingly, the stack depth may decrease for each function (or stack frame) that returns and is popped off of the stack. In certain example embodiments, the growth of a stack may be in a negative direction. Accordingly, each addition may decrease the stack depth. In any event, as a result of a modification of the program counter and/or stack depth the process may move to step 206. In certain example embodiments, the process of retrieving stack data may be based on a timer. For example, stack information may be sampled at a rate of 30 times per second or 10 times per 1/60th of a second. In certain example embodiments, the sampling rate may be a user configurable rate. For example, a user may request a sampling rate of 8000 samples per every 1/60th of a second. In certain example embodiments, processing resources or other constraints may act to "cap" the frequency of the sampling. Accordingly, while a user may request 8000 samples every 1/60th of a second, the actual sampling rate may be less (e.g., 10, 50, 100 samples per 1/60th of a second).

In step 206, a check is run against the storage buffer to see if the buffer is full. When the buffer is full, the process ends and the raw stack data is sent to a computing system 102 for further analysis. In certain example embodiments, the buffer may store a predetermined number of stacks before sending the information to the computing system. For example, 5 stacks may be stored. In certain example embodiments the number may be tied to operating rate of the program. For example, a computer game may operate at 30 frames per second. In such an instance, raw stack data may be retrieved for each frame. Thus, a buffer may be configured to hold 30 stack instances that are then sent to the computer system 102 for analysis.

Continuing on, if the buffer is not full then the executing application's stack depth and current program counter are stored to the buffer in step 208. In certain example embodiments, storage of the stack depth may facilitate determining potential valid addresses. After storing the above values in step 208, a check is performed in step 210 to determine if the return address for the function on top of the call stack is a valid address. In certain example embodiments, this value may be stored in a link register located on the target system 100. If this address is valid, the process proceeds to step 212. If the address is not valid, the process proceeds to step 214.

In step 212, if the checked address from the link register is valid it may then be stored with an associated depth value. For example, a predetermined flag value (e.g., −1 or 0x11111111 in two's-complement notation) may be used to identify that the address in question was stored in the link register. For example, if the address in the link register is 0x04, the address may be considered valid as it falls between the above example calculation for a valid address (e.g., between of 0x04 and 0x20). As a result of this determination, the return address (e.g., the address in the link register), and a value of −1 are added to the raw stack data.

After either step 210 or 212, the current stack depth is checked in step 214 to see if the current stack depth is zero. In certain example embodiments, a current stack depth of zero may indicate that there are no more items on the stack. If the stack depth is zero then the process proceeds to step 222.

However, if the stack depth is not zero, then in step 216 the current address at the current stack depth (e.g., based on the stack depth stored in step 208 and/or updated in step 220) is checked to see if it is a valid address. If the address is not valid, then the next element in the stack retrieved and the current stack depth is decremented in step 220. Conversely, if the address from step 216 is valid, the current address is stored to the raw stack buffer with the current stack depth in step 218. After step 218, the process proceeds to step 220.

After moving to the next element in the stack and decrementing the stack depth, the process loops back to step 214 and continues looping through steps 216, 218, and 220 until the stack depth is zero. Once the stack depth is determined to be zero in step 214, an address and a depth of 0 are stored in the raw stack data in step 222. These values may indicate the end of this stack. In other words, these values may be used as delimiters to indicate separation between multiple raw stack. It will be appreciated that other techniques may be used to indicate the end of a given stack (e.g., a special element type that is inserted and recognized by an analysis program). After adding the above data (program counters, instructions, stack depth, etc), the raw stack data is sent off to the computing system 102 for processing.

In certain example, the gathering of raw stack data may continue until program execution terminates. Alternatively, or in addition, a user or external process may control how many times raw stack data is retrieved.

Parsing Raw Stack Data

As discussed above, raw stack data may be obtained relating to a currently executing computer program from a target computing system. In certain example embodiments, the raw stack data may include data that is not related to the call stack. Accordingly, the raw stack information may need to be "scrubbed."

Figure 4A:
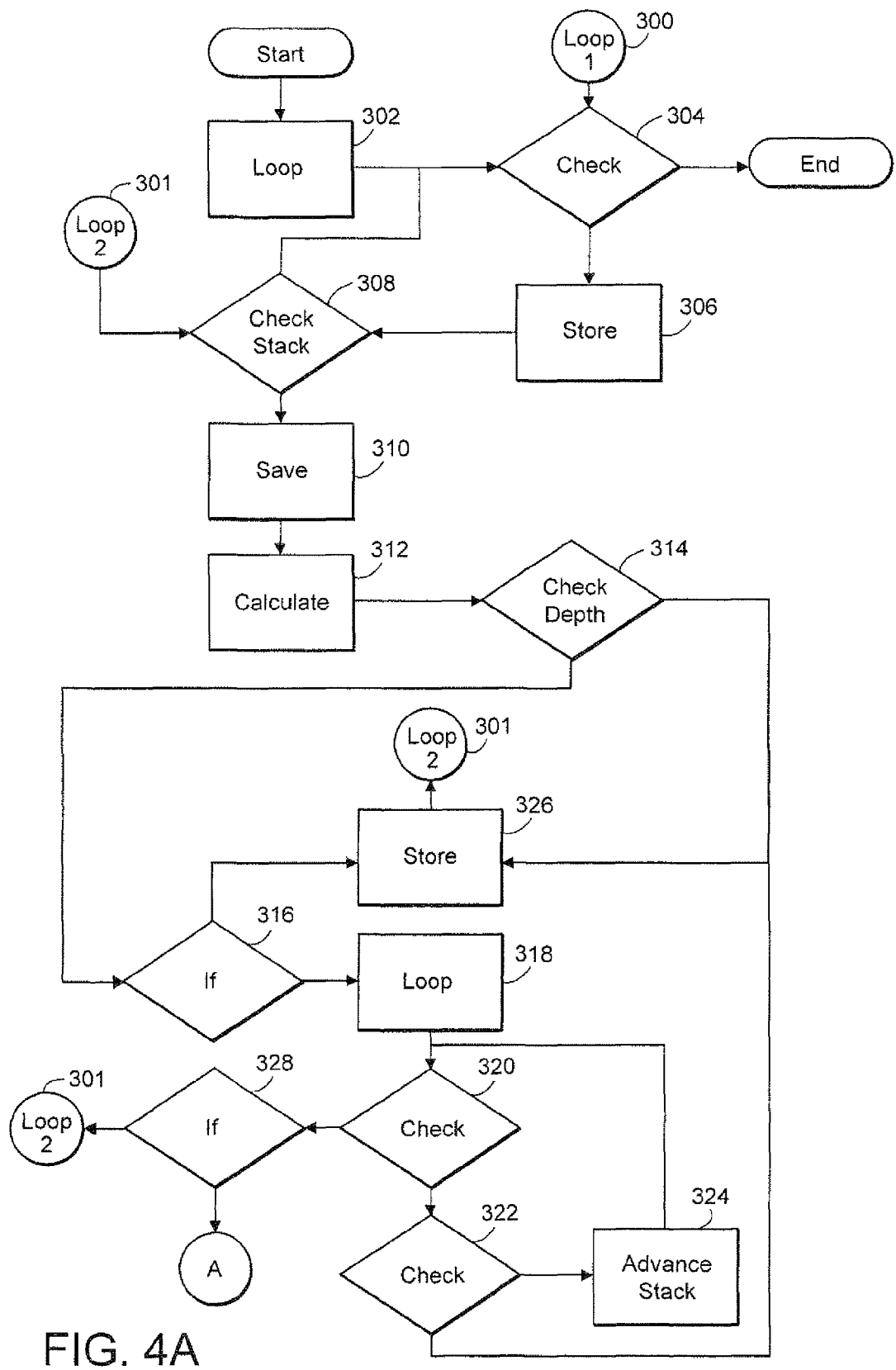
FIGS. 4A and 4B show an illustrative flowchart for parsing stack information to obtain call stack information according to certain example embodiments.
Figure 4B:
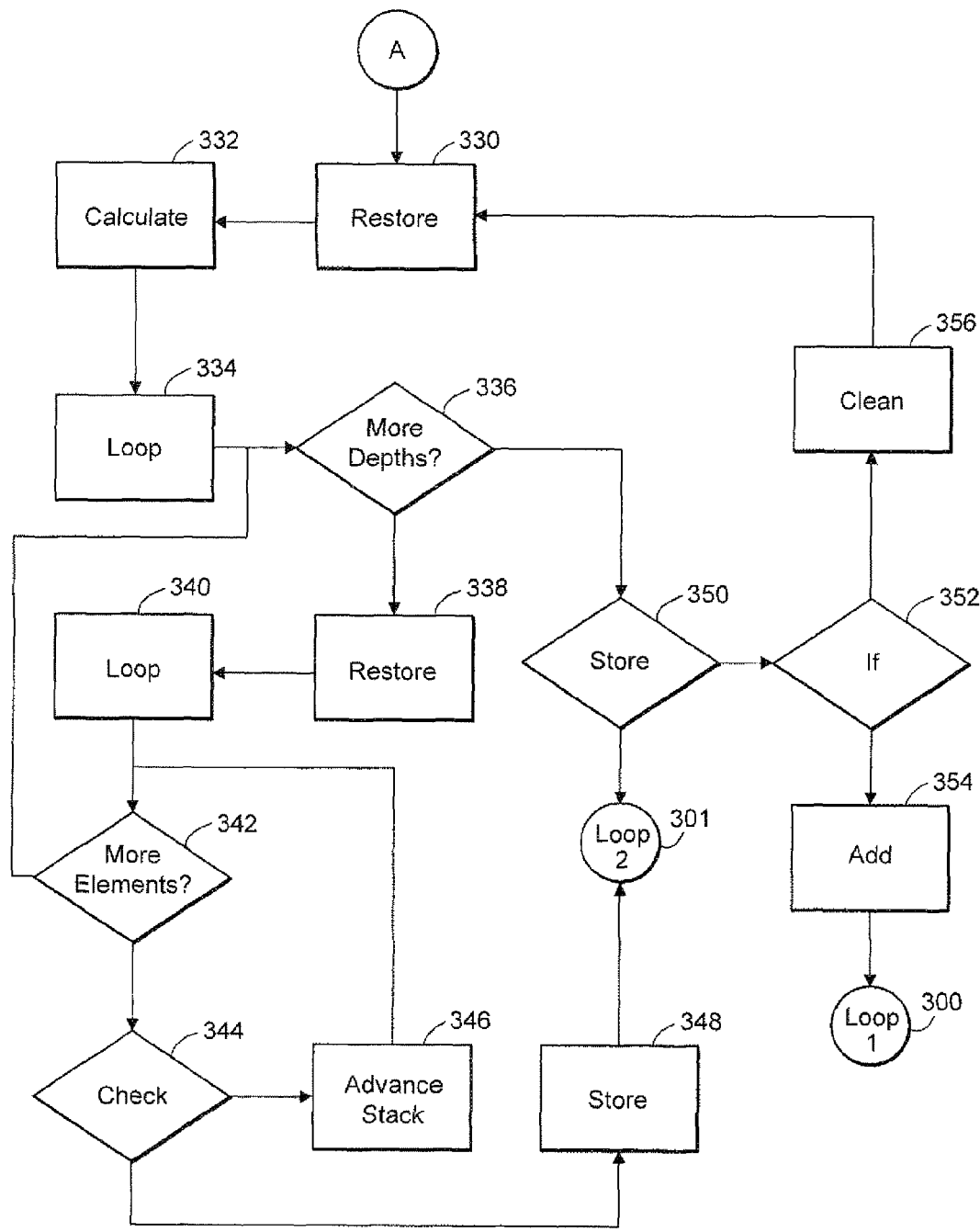

FIGS. 4A and 4B show an illustrative flowchart for parsing the obtained raw stack information to obtain call stack information according to certain example embodiments. First, a loop instruction in step 302 is initiated to loop through a series of stacks. In certain example embodiments, this may allow the parsing process to be done over multiple raw data segments and return multiple call stacks. This may be more efficient in some instances as the batched data may help decrease the communication overhead between the target system 100 and the computing system 102. As shown in FIGS. 4A and 4B, the looping process may be accomplished through point BC 300. In certain example embodiments, the BC point 300 is defined in relation to step 304. Alternatively, or in addition, BC 300 may be defined relative to step 308. In other words, the loop process may "begin" at step 308 and/or step 304.

In any event, the process starts by checking for raw stack data to parse in step 304. In certain example embodiments, the data to be analyzed may include raw stack data that corresponds to a single final call stack. Thus, if there are no more stacks, the process ends. If there is additional stack data to parse, the process proceeds to step 306. In step 306, the first element in the raw stack data is stored onto the "final" call stack. In certain example embodiments, temporary variables may be used to help in the analysis of the call stack data. For example, certain example embodiments may use "CurrentAddress" and "CurrentDepth" to facilitate the analysis of the raw stack data. Thus, the CurrentAddress may be set to the address of the just stored first element and the CurrentDepth may be set to the depth of the first element on the stack. In certain example embodiments, the first element may represent the function that is on the top of the "final" call stack.

After storing the above values in step 306, the process checks if there are any more stack elements to investigate in step 308. If there are no more elements, the process returns to 302 and a new set of raw stack data is investigated. In certain example embodiments, this may occur when there is one function on the stack. Alternatively, if there are more elements in the raw stack data (e.g., if there is more than one function) then the process proceeds to step 310.

In step 310, the current stack element and associated depth are temporarily saved for possible later use and the process continues to step 312. In step 312, the depth from the address of the current stack element to the return address of that stack element is calculated. This depth calculation is described in greater detail below in relation to FIG. 5. As discussed above, certain computer architectures may include the return address in a link register on the target computing system.

In certain example embodiments, a result of the depth calculation may be checked against a value in step 314. This value may be a predetermined value or a previously determined depth value. For example, the calculated depth may be checked against 0. Thus, in this example, if the depth is equal to 0, the process may proceed to step 326.

Alternatively, if the above depth calculation does not match the value in step 314 the process proceeds to step 316. In step 316, the process determines if the link register value was stored on the stack. If the link register was not stored on the stack, the process proceeds to step 326. However, if the link register is present on the stack the process may proceed to step 318. In step 318, a loop is performed between steps 320, 322, and 324 to check if the depth of an item in the stack matches the depth of the address stored in the link register. In step 320, the stack data is checked for additional elements. If there are additional elements, a check is performed in step 322 to see if the depth of the additional element matches the current depth plus the calculated depth (e.g., from step 312). If this calculation does match, the process proceeds to step 326. If there is no match, the next element is selected in step 324 and steps 320, 322, and 324 repeat. Thus, the loop may end in step 320 when there are no additional elements and proceed to step 328 (described below).

In the above mentioned step 326, the next element in the raw stack data is added to the final call stack. Here, the CurrentAddress is set to the address of the element added to the final call stack and the current depth is set to the current depth+the calculated depth (e.g., from step 312). Then, the process loops back to step 308 (e.g., loop 2).

Returning to step 328, a check is performed to see if the process added an element to the final call stack during the present iteration. If an element was added to the final call stack, the process returns to step 308 by jumping back to loop 2. Alternatively, if the process added no additional elements to the final call stack in the current iteration, the temporarily stored CurrentAddress and CurrentDepth from step 310 are restored in step 330.

After restoring these previously stored values, in step 332 the possible depths between the address stored in the link register and the address associated with the current stack element are calculated. In certain example embodiments, this may be similar to step 312. However, in this instance, instead of returning a single depth, all unique depths may be found. In other words, this may take into account special cases where the function does something unexpected to the stack. For example, one special case may be a conditional instruction that modifies the stack. However, as a result of failing the condition the instruction is counted as a "nop" instruction instead.

After calculating the possible depths in step 332, the depths are looped over starting in step 334. In step 336, a check is performed to see if there are additional calculated depths. If there are no additional depths, the process proceeds to 350. Conversely, if the process continues to loop, then in step 338 the current stack element and the current depth are restored to the values that were initially saved off in step 310.

As a further part of the loop started in step 334, and after restoring the CurrentAddress and CurrentDepth in step 338, a loop sub-process begins in step 340 to search the stack for a stack element that matches the depth of the current possible depth in the link register (e.g., from the CalculatedDepths that are determined in step 332). As part of the loop process of 340, in step 342, a check is performed to see if there are any more elements in the stack. If there are no more elements, the sub-loop process of step 340 ends and the process returns to step 336.

However, if there are additional elements in the stack, in step 342 the search process of 340 continues by checking if the current element's depth matches the current calculated depth (e.g., one of the calculated depths from step 332). If this is successful in step 344, (e.g., CurrentDepth=CalculatedDepth), the process moves to step 348. However, if the previously two values are not equal, then the process moves to step 346 and the current element is set as the next element in the stack (e.g., iteration over the elements continues). After advancing the stack, the loop process discussed in step 340 continues by returning to step 342.

If the current depth of the current element does match a calculated depth from step 344, then in step 348, the element of the stack is added to the final call stack. The address of the element added to final call stack is then set to the current address. Additionally, the current calculated depth is added to the current depth to obtain the new current depth. At this point the process returns step 308.

If there are no more possible depths to search over from step 336, then the process proceeds to step 350. Here, if an element has been added to the final call stack in this loop iteration, the process returns to step 308. Alternatively, if the process does not add an element to the call stack in this iteration, then, in step 352, if this is the first time hitting this step during this iteration (e.g., that begins at step 308), the process proceeds to step 356 where the final call stack is cleaned up. In step 356, the cleaning process scrubs the data related to the final call stack down to the data stored in step 306. The remainder of the data in the final call stack is removed (e.g., deleted). After cleaning the final call stack, the process returns to step 330. However, if this is the second time the process through step 352, an "UNKNOWN" element is added to the final call stack. In other words, for a given raw call stack that is processed by the example process in FIGS. 4A-4B, if the process passes step 328 twice an "UNKNOWN" element is added. After adding this element, the process returns to step 304.

Accordingly, raw stack data retrieved from a target system may be analyzed. Call stack information may be extracted, cleaned up, and presented to a user. Further, in certain example embodiments, the raw stack information may be cached during this process.

Calculating Depths

As discussed above, in certain example embodiments, as the final call stack is being developed and/or determined, the depth to a return address may be calculated.

Figure 5:
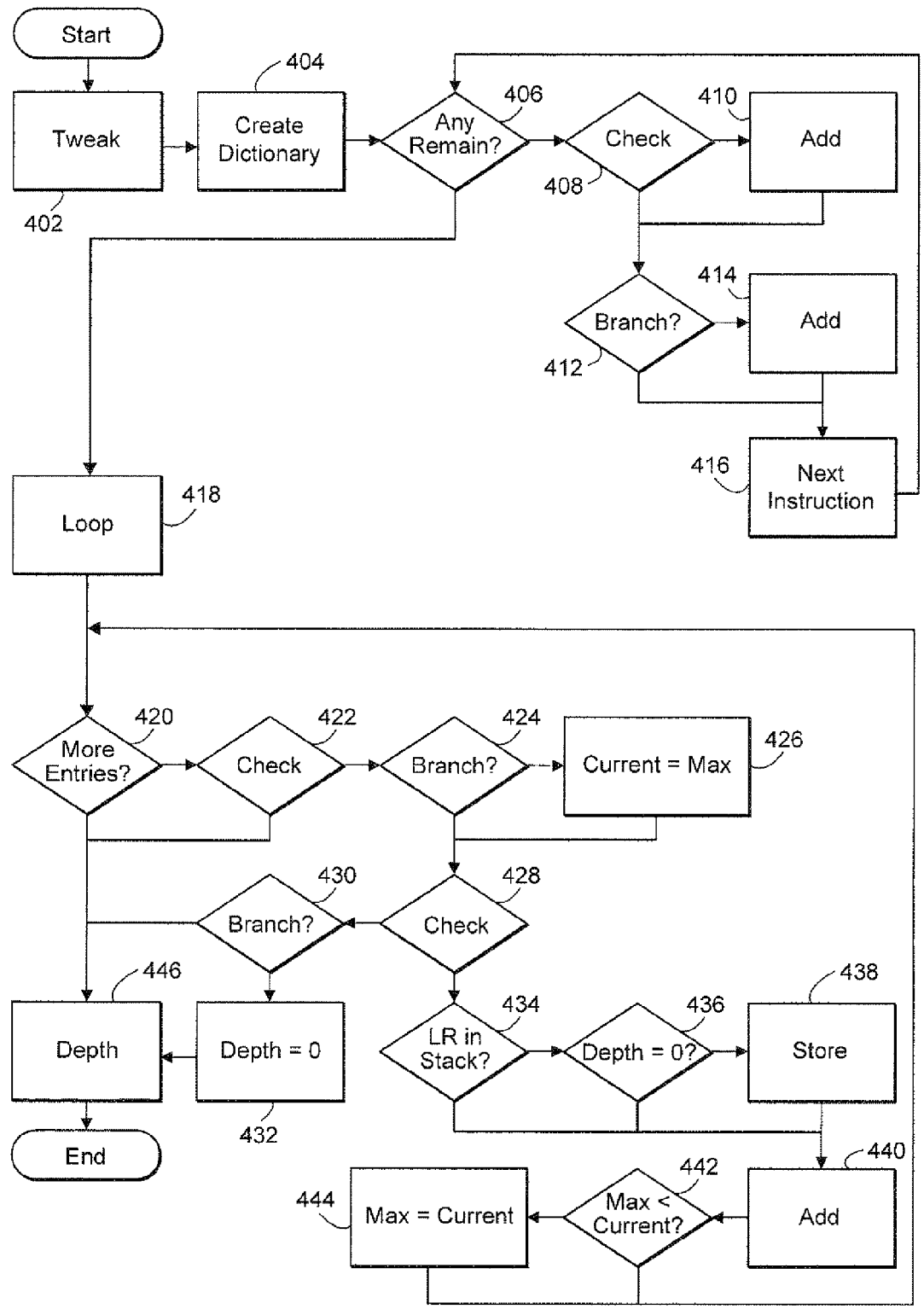
FIG. 5 shows an illustrative flowchart for determining a depth to a return address for a function according to certain example embodiments.

FIG. 5 shows an illustrative flowchart for determining a depth to a return address for a function according to certain example embodiments. In certain example embodiments, the input may be function information that includes local variables defined within the function and/or parameters being passed into the function. Additionally, the current offset into the function (e.g., where the program counter is pointing) may additionally be used as input for the process described in FIG. 5.

The process begins at step 402 where tweaks are made for functions that may behave oddly (e.g., with respect to how the functions interact with the stack). One example of a function that may behave "oddly" and may be tweaked is a function that is part of a tail call (e.g., tail call optimization). Thus, in certain example embodiments, tweaking may include adjusting or modifying the start depth that is used in the depth calculation to a non-zero value. In certain example embodiments, a user may manually, or the example process may automatically, tweak the starting depth based on how the function being interrogated by the process shown in FIG. 5 operates. As an example, if a function is assumed to start with a non-zero stack depth, its behavior would be tweaked in step 402. After any potential tweaking in step 402, the process proceeds to step 404 where a loop is started. In certain example embodiments, the loop may place all instructions of the function into a dictionary. In certain example embodiments, the loop may place instructions that modify the stack depth into the dictionary. In certain example embodiments the dictionary may include a hash table. Alternatively, or in addition, other data structure techniques may be used. In any event, in step 406, a check is performed to determine if there are additional instructions to be added to the dictionary. If there are no more instructions the process proceeds to step 418 (described below). However, if there are additional instructions to be placed in the dictionary, the process moves to step 408.

In step 408, the instruction currently being interrogated may be checked to see if it is one that modifies the stack in some manner. If this current instruction does not modify the stack, the process proceeds to step 412.

However, if the instruction does modify the stack, then in step 410, this instruction, the instruction offset, and the stack delta are added into the dictionary.

Either through step 408 or additionally through step 410, the process proceeds to step 412 where a check is performed to see if the current instruction is a branching instruction. For example, one type of branching instruction may be an "if" instruction. If the current instruction is a branching instruction, the process proceeds to step 414.

In step 414, the current instruction offset and its associated type are added to the dictionary. In certain example embodiments, the type of instruction may include a jump (e.g., goto) instruction, a function call, and/or a return (e.g., an exit of the current function). After step 414 or step 412, the process looks at the next instructions and proceeds to step 406.

Once the instructions of the function are organized (e.g., steps 404-416) then the process may move to step 418 where the process loops through the elements of the dictionary. Initially, in step 418, the data values of the current depth and the maximum depth are set to 0. Here, the "tweaking" mentioned above may be used to depth the maximum depth to the tweaked depth determined or set in step 402. After this initialization the process proceeds to step 420.

In step 420, a dictionary entry is obtained. If there are no more entries, the process proceeds to step 446 (described below) and then ends. In certain example embodiments, this returns to the process discussed with respect to FIGS. 4A-4B.

After retrieving an entry from the dictionary in step 422, a check is performed to see if the offset into the current function exceeds the offset stored in the dictionary associated with the currently examined entry. If the offset into the function exceeds the dictionary offset (e.g., the one from the current instruction of the dictionary being examined), then the process jumps to step 446.

Alternatively, when the offset into the function does not exceed the dictionary offset, the process proceeds to step 424 where the current entry from the dictionary is checked to see if it is a branch statement (e.g., an "if" statement). If the instruction is a branch statement, then, in step 426, the current depth is set to the maximum depth.

After step 424 or step 426, the process arrives at step 428 where a determination is made if the current offset is equal to the offset into the function. If the offsets are equal, then process proceeds to step 430 where another check is performed to see if the current instruction is a branch statement. In certain example embodiments, the process may also check to see if the branch instruction is of a type "return." In any event, if the check of step 430 is satisfied, and the current instruction is a branch statement, then in step 432 the current depth is set to 0 where the process proceeds to step 446 and ends.

Alternatively, if the current instruction is not a branch statement in step 430, then the process proceeds to step 446 and ends.

Returning to step 428, if the current offset and the offset into the function are not equal, then in step 434 a check is performed to see if the current function stored the address located in the link register on the stack. For example, (e.g., the function call of "CalculateTax" in the function "SalesOrder" discussed above). Accordingly, in such an example and in the process of calling the function CalculateTax, the return address for this instance of CalculateTax is placed in the link register. In certain instances, a compiler or other assembly code may store the link register multiple times. To account for this, in certain example embodiments, the first instance of the stored link register value may be used If the current instruction did store the link register address in the stack, then, in step 436, a check is performed to see if the current depth is zero. If the current depth is not zero the process continues to step 438 where a separate depth to the link register is stored. This stored value may later be used in, for example, step 446.

Step 440 is arrived at from one of steps 434, 436, or 438 (e.g., if the current instruction did not store the link register address, if the stack depth was zero, and/or after the separate depth was stored). In step 440, the current depth is calculated by adding the current depth to the dictionary offset.

After recalculating the current depth in step 440, then, in step 442, if the current depth is greater than the max depth, the max depth is set to the current depth in step 444. If the current depth is greater than the max depth the process returns to step 420. Also, the process proceeds to step 420 after setting the max depth in 444.

As discussed above, a final step in this process may include step 446. In step 446, the depth to the return address is determined to be the current depth unless the separate depth was calculated in step 438. In certain instances, where the link register depth has been stored, the return address is the link register depth. Accordingly, the depth to the return address may be determined.

Example Depth Calculation

Table 3 shows an illustrative non-limiting example of raw stack data that may be obtained from a target computing system.

TABLE 3

Raw Stack Data:

0x00110000: bar( )
0x00000010: stack depth in current function
0xFFFFFFFF: −1 to signify the link register stored
0x00101000: foo( )
0x0000000C: stack depth of next possible address
0x00100100: value stored on stack for function foo( ) that happens to pass the Valid Address test
0x00000004: stack depth of next possible address
0x00100000: main( )
0x00000000: end of raw stack marker (1)
0x00000000: end of raw stack marker (2)

Table 4 shows an illustrative non-limiting example of a determined final call stack according to certain example embodiments.

TABLE 4

Final Call stack Data:

0x00110000: bar( )
0x00101000: foo( )
0x00100000: main( )

The following is a non-limiting illustrative example of a result of the data in Table's 3 and 4. It will be appreciated that example data is shown in an exemplary format that may be used in conjunction with certain example embodiments. In one example embodiment, a profiler may be used to facilitate development of computer programs for a handheld device. The profiler may use the above encoding for the stack information. However other types and/or encoding schemes for the data presented above may be used in accordance with certain example embodiments.

An example process related to processing the above data may start by looking at the function "bar( )" in the Raw Stack Data shown in Table 3. Using the example flow charts in FIGS. 4A-4B, starting at step 302, the process moves to step 304. As there is still a stack to parse, the process moves to step 306 where the first element, "bar( )" is saved to the final call stack data. In certain example embodiments, this is the function sitting at the "top" of the final call stack. Also in step 306, the current address is set to 0x00110000 and the depth of this instruction is set to 0x00000010. Next, as there are more elements in the raw stack (step 308), the process continues to step 310 where the process saves the current address (0x00110000) and depth (0x00000010) for later use.

In step 312, the process calculates the depth to the link register stored in the stack. However, in the case of "bar( )" the address in the link register is not stored (e.g., because it is still in the link register). As such, the calculated depth to the link register address in the stack is 0. Next, the process proceeds to step 326, where the next element, "foo( )" is stored in the final call stack data (see table 4). The address of "foo( )" 0x00101000, is also set in the final call stack. Also set are the current address value and the current depth. However, when setting the current depth to a new current depth, since the depth is −1, the current depth is set to 0x00000010. The process returns to step 308.

As there are more elements in the raw stack data, the current address 0x00101000 and current depth 0x00000010 are saved for later use. Next, in step 312, the depth to the return address (e.g., link register) is calculated. In this instance, the depth to the link register address is −12 from the current position within the function foo( ) Accordingly, with the depth to the link register address found to be −12, the loop process of step 318 is started.

Here the process looks for an instruction in the raw stack information that matches the current stack depth plus the recently calculated depth. With a current stack depth of (0x00000010) plus the recently calculated depth of −12, the process looks for an instruction at the stack depth of 0x00000004 (e.g., 16−12). The loop process of steps 320, 322, and 324 is run to find this instruction.

Specifically, the next element in the raw stack data has a stack depth of 0x0000000C. As this depth does not equal the above depth (0x00000004), the process continues searching where the next element is "main( )" and the process returns to step 320.

The stack depth associated with "main( )" is 0x00000004. As this equals the above calculated depth, the process moves to step 326 and stores "main( )" in the final call stack data. The current address is then set to the address of "main( )", 0x00100000, and the current depth is set to 0x00000004. The process then returns to 308. However, the next elements are the raw stack markers (e.g., the delimiters). Accordingly, the process determines that there are no more elements on the stack to consider and the process returns to step 304. The process ends, and the final call stack of Table 3 is presented to a user.

Figure 6:
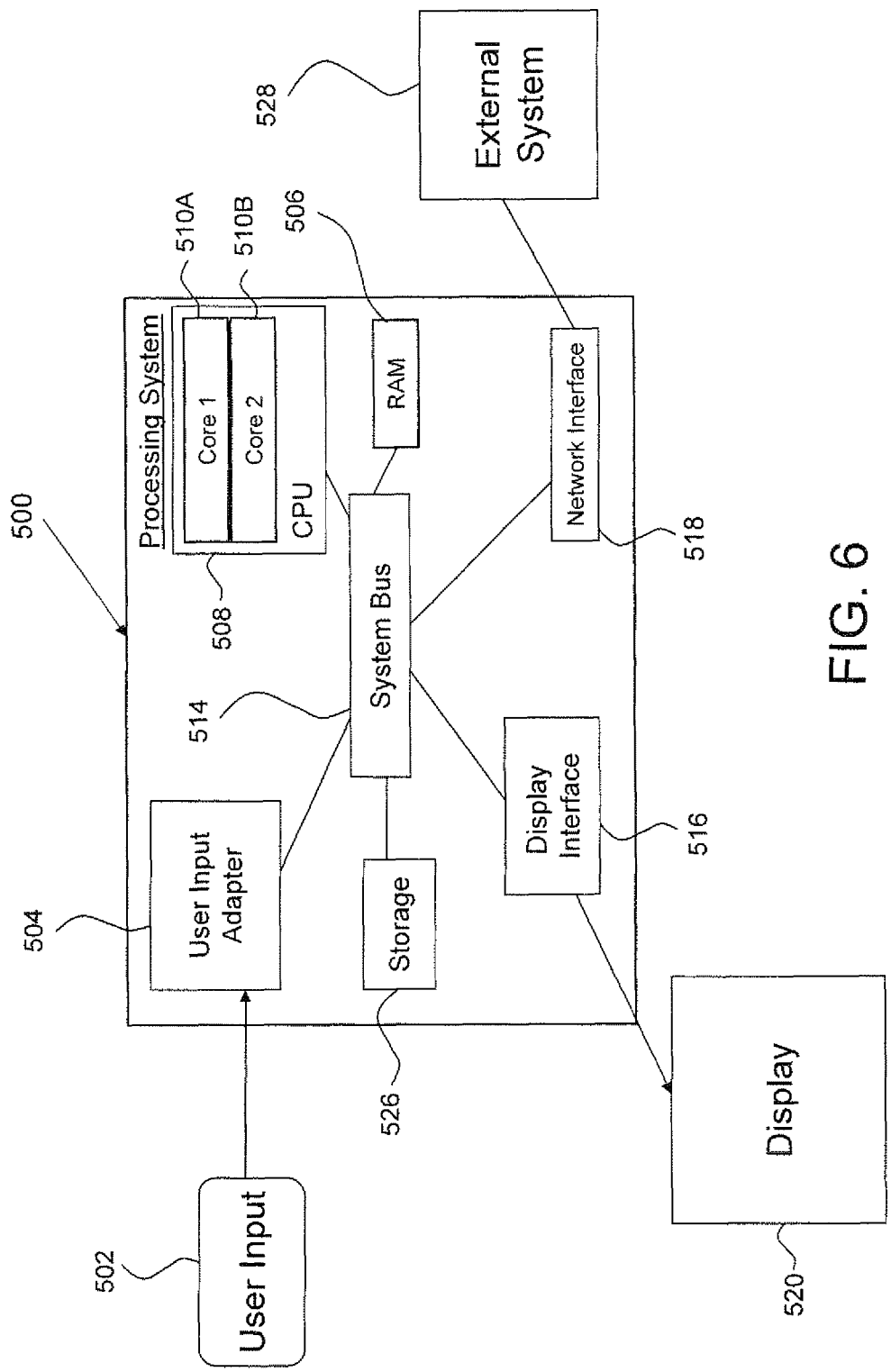
FIG. 6 is an exemplary illustrative non-limiting block diagram showing an example computing system.

FIG. 6 is an exemplary illustrative non-limiting block diagram showing an example computing system for implementing certain exemplary techniques described herein. In certain example embodiments the example computing system may be target system 100 and/or computing system 102 from FIG. 2A. In certain example embodiments, the two may be the same computing system. Processing system 500 may include CPU 508 that may have cores 1 and 2, 510A and 510B respectively. In certain example embodiments, core 1 510A may be the target system 100 and core 2 510B may be the computing system 102. The CPU 508 may communicate with RAM 506 and storage medium 526 through system bus 614. Processing system 500 may facilitate user input through a user input adapter 504 and user input 502. For example to give commands or to interact with an analysis program. User input may be provided through a keyboard, mouse, touch screen, or the like. Processing system 500 may also provide video through display interface 516 to display 520 (e.g., an LCD or other similar display device). In certain example embodiments, multiple processing systems may be used for analysis of data. Accordingly, processing system 500 may also include a network interface 518, such as, for example, an Ethernet card or the like. This may facilitate communication between the processing system 500 and an external system 528. External system 528 may be another processing system (e.g., similar to processing system 500) that stores stack data. Alternatively, the external system 528 may be the target system 100 or the computing system 102.

In certain example embodiments, the execution of a computer program may be done on an ARM microprocessor.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

The above description is provided in relation to embodiments which may share common characteristics, features, etc. It is to be understood that one or more features of any embodiment may be combinable with one or more features of other embodiments. In addition, single features or a combination of features may constitute an additional embodiment (s).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:

1. A computer-implemented method for determining program flow, the method comprising:
determining an address range of potential function addresses for a computer program;
extracting raw stack information from execution of the computer program based at least in part on the determined address range, where the raw stack information includes a plurality of addresses, each one of the plurality of addresses in the extracted raw stack information having an associated stack depth that indicates a distance from a start of a stack for the executed computer program to the respective one of the plurality of addresses within the stack;
parsing the raw stack information by using the associated stack depth for respective ones of the plurality of addresses to identify which of the plurality of addresses are function addresses associated with active functions of the computer program, where identification of which ones of the plurality of addresses are associated with active functions further includes determining an address distance between at least one of the plurality of addresses and a return address;
constructing a call stack based at least in part on the identified ones of the plurality of addresses that are associated with active functions of the executed computer program; and
presenting the constructed call stack of the computer program to a display.

2. The method of claim 1, wherein determining the address range further includes using a symbol table of the computer program.

3. The method of claim 1, wherein the computer program includes no debug information during execution.

4. The method of claim 1, wherein the raw stack information includes a plurality of data segments, each one of the data segments related to a different call stack.

5. The method of claim 4, wherein the constructing includes constructing a plurality of call stacks respectively based at least in part on the plurality of data segments.

6. The method of claim 1, wherein the parsing further includes determining a plurality of address distances between the at least one of the plurality of addresses and a plurality of return addresses of a function associated with the at least one of the plurality of addresses.

7. The method of claim 1, further comprising analyzing assembly code of the computer program,
wherein the address distance is determined based at least in part on the analyzed assembly code of the computer program.

8. The method of claim 1, wherein the parsing further includes removing addresses that are not related to functions pushed during execution of the computer program.

9. The method of claim 1, execution of the computer program on a first computer system is substantially unaffected by the extraction of raw stack information.

10. A system for determining a call stack of a computer program that is executed on a target computer system, the system comprising:
a processing system that includes at least one processor, the processing system configured to:
obtain stack information from the target computer system that includes function addresses that were on the stack of the computer program during runtime of the computer program;
determine that a first address in the stack information is associated with a called function that is to be included in a call stack;
analyze code instructions associated with the called function to determine how the code instructions modify the stack during execution thereof;
determine a stack distance to where a return address of the called function is located within the stack information based on analysis of the code instructions associated with the called function, the return address being a function address associated with a caller function that called the called function;
determine the return address in the stack information based on the determined first address associated with the called function and the determined stack distance;
assemble the call stack based at least in part on the determined first address and the determined return address; and
output, to a display device, the assembled call stack.

11. The system of claim 10, wherein some addresses included in the stack information are function pointers passed in as parameters to the called or caller function.

12. The system of claim 10, wherein performance of the computer program during runtime on the target computer system is substantially not impaired by collection of the stack information.

13. The system of claim 10, wherein the code instructions are assembly code instructions that are executed by the target computer system.

14. A non-transitory computer readable medium storing computer-readable instructions for performing an analysis program for use on a computing system that includes at least one processor, the stored instructions comprising instructions configured to:
- determine an address range of potential function addresses of a computer program;
- transmit the determined address range to a target computing system;
- communicate with the target computing system to execute the computer program;
- receive raw stack data from the target computing system based at least in part on execution of the computer program on the target computing system and the determined address range;
- parse the raw stack data to determine active functions that were on a stack of the target computing system during execution of the computer program, where at least one of the active functions is determined based on a stack distance between a determined function address on the stack and a return function;
- build a final call stack based at least in part on the parsed raw stack data and the determined active functions; and
- present the final call stack.

15. The medium of claim 14, wherein the raw stack data includes function pointers passed in as parameters for functions placed onto the call stack of the target computing system.

16. The medium of claim 14, wherein the computer program includes substantially no debug information.

17. The medium of claim 14, wherein determination of the address range includes parsing a symbol file of the computer program.

18. The medium of claim 14, wherein the stack distance is determined based at least in part on analyzing code instructions of the computer program to determine how the code instructions modify a stack during execution of the computer program on the target computing system.

19. The medium of claim 14, wherein during the raw stack data is cached for parsing.

* * * * *